(12) United States Patent
Roty

(10) Patent No.: US 10,549,581 B2
(45) Date of Patent: Feb. 4, 2020

(54) DEVICE FOR ATTENUATING ROLLING NOISE FOR A TIRE

(71) Applicants: COMPAGNIE GENERALE DES ESTABLISSEMENTS MICHELIN, Clermont-Ferrand (FR); MICHELIN RECHERCHE ET TECHNIQUE, S.A., Granges-Paccot (CH)

(72) Inventor: Gael Roty, Clermont-Ferrand (FR)

(*) Notice: Subject to any disclaimer, the term of this patent is extended or adjusted under 35 U.S.C. 154(b) by 305 days.

(21) Appl. No.: 15/535,320

(22) PCT Filed: Dec. 11, 2015

(86) PCT No.: PCT/EP2015/079485
§ 371 (c)(1),
(2) Date: Jun. 12, 2017

(87) PCT Pub. No.: WO2016/092094
PCT Pub. Date: Jun. 16, 2016

(65) Prior Publication Data
US 2019/0001754 A1    Jan. 3, 2019

(30) Foreign Application Priority Data
Dec. 12, 2014    (FR) ..................... 14 62335

(51) Int. Cl.
 B60C 11/13    (2006.01)
 B60C 11/04    (2006.01)
(52) U.S. Cl.
 CPC ........ B60C 11/042 (2013.01); B60C 11/1307 (2013.01); B60C 11/1353 (2013.01);
(Continued)

(58) Field of Classification Search
 CPC ............. B60C 11/1307; B60C 11/1353; B60C 2011/1361; B60C 2011/1338
 See application file for complete search history.

(56) References Cited

U.S. PATENT DOCUMENTS

| 6,119,744 A | 9/2000 | Tsukagoshi |
| 2013/0112326 A1 | 5/2013 | Mellara et al. |
| 2014/0338805 A1 | 11/2014 | Roty et al. |

FOREIGN PATENT DOCUMENTS

| DE | 4403662 A1 | 8/1995 |
| EP | 0908330 A1 | 4/1999 |

(Continued)

OTHER PUBLICATIONS

Machine translation for Japan 2006-341655 (Year: 2019).*
Machine translation for Japan 07-309105 (Year: 2019).*
Machine translation for Japan 03-276802 (Year: 2019).*

*Primary Examiner* — Steven D Maki
(74) *Attorney, Agent, or Firm* — Dickinson Wright PLLC

(57) ABSTRACT

The disclosure is related to a tread for a tire, this tread having a tread surface intended to come into contact with a roadway and comprising at least one groove of width W and depth P delimited by two facing lateral walls, these lateral walls being connected together by a groove bottom. At least one groove has a plurality of closing devices for reducing the running resonance noise generated by this groove, each closing device comprising at least two sets of flexible blades, a first set is connected to the bottom of the groove and is intended to flex around a first axis, and at least one second set connected to a lateral wall delimiting the groove, this second set being intended to flex around a second axis, this second axis being different than the first axis.

8 Claims, 2 Drawing Sheets

(52) U.S. Cl.
CPC ............... *B60C 2011/1338* (2013.01); *B60C 2011/1361* (2013.01)

(56) References Cited

FOREIGN PATENT DOCUMENTS

| | | | |
|---|---|---|---|
| FR | 2715891 | A1 | 8/1995 |
| FR | 2983431 | A1 | 6/2013 |
| JP | 03-276802 | A * | 12/1991 |
| JP | 07-309105 | A * | 11/1995 |
| JP | 2006-341655 | A * | 12/2006 |
| JP | 2007210569 | A | 8/2007 |
| JP | 2012116339 | A | 6/2012 |
| WO | 2011132064 | A1 | 10/2011 |

* cited by examiner

DEVICE FOR ATTENUATING ROLLING NOISE FOR A TIRE

CROSS-REFERENCE TO RELATED APPLICATIONS

This application is a 371 national phase entry of PCT/EP2015/079485, filed 11 Dec. 2015, which claims the benefit of French Patent Application No. 1462335, filed 12 Dec. 2014, the contents of which are incorporated herein by reference for all purposes.

BACKGROUND

Conventionally, a tire comprises a tread intended to be in contact with a road while a vehicle provided with tires is being driven. This tread is provided with a tread pattern formed by raised elements, these elements delimiting grooves for draining water present on the road during wet weather. However, the presence of grooves, and notably of circumferentially oriented grooves, is a source of rolling noise.

A block is a raised element formed on the tread, said element being delimited by voids or grooves and comprising lateral walls and a contact face intended to come into contact with the roadway. This contact face has a geometric center defined as being the barycenter or center of gravity of the face.

A rib is a raised element formed on a tread, this element extending in the circumferential direction and making a complete circuit of the tire. A rib comprises two lateral walls and a contact face, the latter being intended to come into contact with the roadway during rolling.

A radial direction is understood to mean in the present document any direction which is perpendicular to the axis of rotation of the tire (this direction corresponds to the direction of the thickness of the tread).

A transverse or axial direction is understood to mean a direction parallel to the axis of rotation of the tire.

A circumferential direction is understood to mean a direction tangential to any circle centered on the axis of rotation. This direction is perpendicular both to the axial direction and to a radial direction.

A groove denotes the space delimited by facing walls of material, these walls being connected together by a groove bottom. Under the usual rolling conditions, the walls delimiting this groove cannot come into contact with one another.

The tread surface of a tread corresponds to the surface of the tread that is intended to come into contact with ground during the rolling of a tire provided with such a tread.

It is known that, as a tread enters the contact region in which it is in contact with a road during rolling, air is made to circulate in each groove. With the road, each groove forms a sort of tube having two open ends, the length of the tube corresponding to the length of the contact patch.

The air contained in this tube forms a column of air that is made to vibrate during rolling and the resonant frequency of which depends on the length separating the two ends of the tube and consequently on the length of groove in contact with the roadway.

This resonance of the air in the grooves has the consequence of generating, in a vehicle equipped with these tires, a noise inside the vehicle and a noise outside the vehicle. These inside and outside noises frequently correspond to a frequency close or equal to 1 kHz, which corresponds to a frequency to which the human ear is particularly sensitive.

In order to reduce such resonance noise, it is known (see for example the patent document FR2715891) to arrange in each groove of circumferential or generally circumferential orientation, a plurality of noise attenuating devices, each device being composed of membranes or relatively thin flexible blades of rubber compound, each membrane or flexible blade occupying the entire cross section of the groove or at least a large portion of this cross section so as to form a closing device. The installation of these flexible blades changes the length of each air pipe and thus makes it possible to change the resonant frequency. This results in a change in the perceived noise. The elastic nature of the material of each flexible blade also ensures sufficient return forces for returning the flexible blades into a position closing the groove when liquid is no longer flowing in said groove.

Each flexible blade can extend from the bottom of the groove or be fixed to at least one of the walls delimiting said groove. Relatively thin is understood to mean that each flexible blade is able to flex in order to at least partially open the cross section of the groove under the effect of a flow of liquid notably when driving in the wet. These same blades remain in the position closing the groove when driving in the dry. As has been recalled above, the devices formed of flexible blades that are described in the prior art—on account of the need to be able to flex under a flow of liquid—are connected either to the bottom of a groove or to one of the lateral walls delimiting a groove.

By virtue of these flexible blades, the length of the column of air in each circumferential groove is reduced compared with the overall length of the groove in the contact, and this results in a change in the resonant frequency. The shift in frequency is toward resonant frequency values to which the human ear is less sensitive.

In devices formed of a single blade carried by the bottom of a groove of given depth, it is sometimes difficult to reconcile good molding and good flexibility of the blade. This is because the greater the height of the flexible blade and the finer the inflow of material during molding, the smaller the thickness of each flexible blade. This state of affairs causes a person skilled in the art to make certain compromises, notably with regard to the thickness of the flexible blade. This results in greater rigidity in the new state for each flexible blade, this increase in rigidity being even more appreciable in the part-worn state. The same type of drawback is encountered with devices formed of flexible blades carried by one or two lateral walls.

The documents JP 2007/210569 A and DE 44 03 662 A1 describe devices comprising several flexible blades.

The document EP 908330-B1 discloses a noise reducing device, said device being formed by three flexible blades, two of which are fixed to the walls delimiting a groove, and the third of which is fixed to the bottom of this groove. In this arrangement, the blade fixed to the bottom extends as far as the tread surface in the new state and raises the same production problems as those already mentioned. Furthermore, the two other blades are not sufficiently flexible.

The expression "lateral wall delimiting a groove" is interpreted in the present document as denoting one or the other of the facing lateral walls, these walls being connected together by a groove bottom. The height of the groove bottom corresponds to the legal wear limit indicated by at least one wear indicator.

SUMMARY

The present disclosure is an improvement of the groove closing devices allowing a reduction in resonance noise, and aims both to obtain easy molding and demolding of the flexible blades forming the device for closing the grooves and complete closure of the groove.

To this end, the subject of the disclosure is a tread for a tire, this tread having a tread surface intended to come into contact with a roadway and comprising at least one groove of width W and depth P delimited by two facing lateral walls, these lateral walls being connected together by a groove bottom. At least one groove has a plurality of closing devices for reducing the running resonance noise generated by this groove, each closing device comprising at least two sets of flexible blades, a first set is connected to the bottom of the groove and is intended to flex around a first axis, and at least one second set connected to a lateral wall delimiting the groove, this second set being intended to flex around a second axis, this second axis being different than the first axis.

The tread according to the disclosure is configured such that:
  each blade of the first set extends over a maximum height H at most equal to 25% of the depth P measured from the bottom of the groove in the new state;
  each second set (51) comprises at least two flexible blades (511) extending over at least half the width of the groove;
  the flexible blades of the first and second sets have complementary geometries that are suitable for cooperating with one another so as to close at least 70% of the cross section of the groove.

Furthermore, each of the flexible blades of each second set has two lateral faces that obstruct the flow of air in the groove, these lateral faces being connected together by edge walls forming the thickness of the blade, an upper edge wall being intended to come into contact with the road during rolling and a lower edge wall facing the bottom of the groove in which the closing device is disposed, the lower edge wall making a non-zero average angle A with a direction passing through the connecting points between the lateral walls and the bottom of the groove, this angle A being such that the lower edge wall tends to diverge from the bottom of the groove when progressing along this lower edge wall from the lateral wall to which it is fixed.

Preferably, the average angle A of the lower edge of the flexible blades of each second set is at least equal to 10° and even more preferably at least equal to 20° in order to make demolding easier by reducing the forces that act on the blades during the demolding operation.

In one variant of the disclosure, the flexible blades of the first set and of each second set are disposed so as to be offset from one another so as to allow partial overlapping between the lateral faces of said blades when considered in pairs and thus to produce more complete closure of the cross section of the groove.

By virtue of this device, the first set of flexible blades can flex around a first axis passing through the points of contact of these blades with the bottom of the groove; flexion under the effect of a liquid flowing through the groove causes the first set of flexible blades to be pressed against the bottom of the groove. Each second set of flexible blades connected to a lateral wall delimiting the groove tends to flex around an axis parallel to said wall; flexion under the effect of a liquid flowing through the groove causes each second set of flexible blades to be pressed against the lateral wall.

More preferably, the maximum height H of each flexible blade of the first set fixed to the bottom of the groove is at most equal to 15% of the depth of the groove.

Advantageously, the first flexion axis is perpendicular or virtually perpendicular to the second flexion axis (in the latter case, the angular offset between the two directions is at least equal to 80°).

Advantageously, the flexible blades of the device according to the disclosure cooperate so as to close the cross section of the groove over at least 90% of the cross section of said groove in the new state.

Advantageously, the thickness of each flexible blade carried by the groove bottom is less than the thickness of each flexible blade carried by a lateral wall. Advantageously, the thickness of each flexible blade fixed to the bottom of the groove is at most equal to 0.4 mm and even more advantageously at most equal to 0.3 mm.

In one variant of the disclosure, the noise reducing device formed in a groove comprises a first set of flexible blades of triangular geometry connected to the bottom of the groove.

In another variant, the noise reducing device formed in a groove comprises a first set of flexible blades of triangular geometry connected to the bottom of the groove, this first set of blades comprising at least two flexible blades. In this variant of the disclosure, the formation of two flexible blades carried by the bottom of the groove makes it possible to obtain great flexibility regardless of the wear level of the tread.

In another variant, the noise reducing device formed in a groove comprises a first set of flexible blades of triangular geometry connected to the bottom of the groove and at least one second set of flexible blades carried by a lateral wall, the shape of which is complementary to that of the first set so as to close the cross section of the groove, these first and second sets being offset with respect to one another in the main direction of the groove so as to be able to create an overlap between said blades and thus obtain better closure of the cross section of the groove.

The main direction of a groove is understood here to mean the direction followed by the liquids that can be made to flow through said groove when driving in the wet.

By virtue of the device according to the disclosure, it is possible, in the new state, to close the entire groove while retaining significant flexibility of each part of the device, regardless of the state of wear to the tread.

This noise reducing device can of course be employed with any type of groove, be it a groove of circumferential orientation or transverse or oblique orientation.

Further features and advantages of the disclosure will become apparent from the following description with reference to the appended drawings which show, by way of nonlimiting examples, embodiments of the subject matter of the disclosure.

DETAILED DESCRIPTION

For the figures accompanying this description, identical reference signs can be used to denote variants of the disclosure where these reference signs refer to elements of the same kind, whether structurally or functionally.

Figure 1:
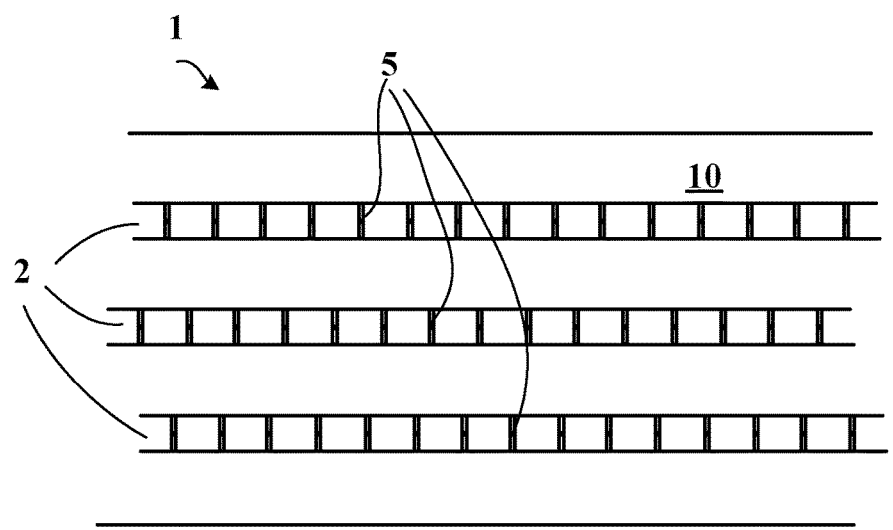
FIG. 1 shows a surface view of a tread according to the disclosure in the new state.

FIG. 1 shows a partial view of the surface of a tire tread 1, this tread 1 comprising three grooves 2 of circumferential orientation. In order to reduce the noise associated with the resonance of air in each groove 2 on passing through the contact with the road, a plurality of resonance noise reducing devices 5 are formed in each groove.

Figure 2:
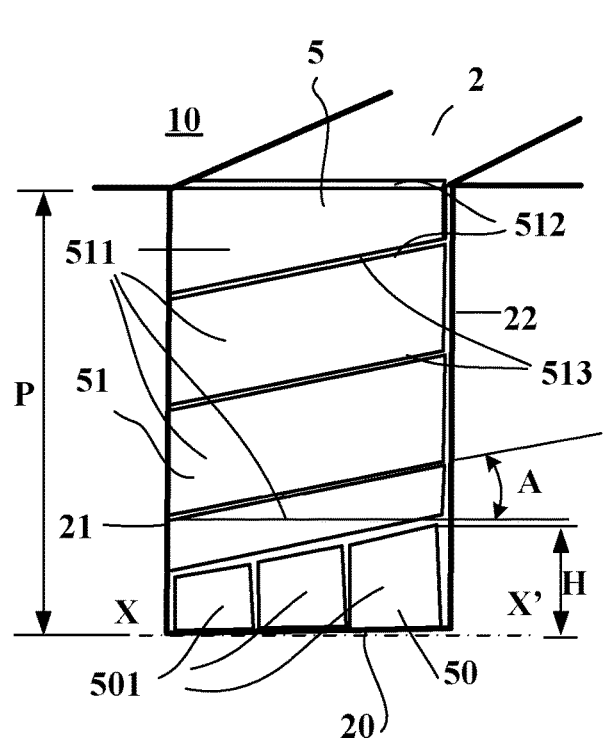
FIG. 2 shows a device according to the disclosure in a position closing a groove.

In FIG. 2, one of these devices is shown in the closed state, that is to say in a position such that the cross section of the groove is closed—in this case the cross section of the groove is closed over 90% of its area—by this device in order to reduce the length of the air-filled pipe that can start to resonate and at the same time to prevent the air from circulating.

In this FIG. 2, a groove 2 of generally circumferential orientation formed on the tread 1 can be seen in cross section. This groove of width W is delimited by lateral walls 21, 22 of raised elements, these facing lateral walls being connected by a groove bottom 20. This groove 2 has a total depth P in the new state, that is to say before any rolling and thus before any wear. The tread has a tread surface 10 intended to come into contact with the roadway during rolling. During rolling, this tread surface becomes worn and progressively approaches the bottom of the grooves. In order to retain a sufficient drainage capacity necessary for the safety of the user, provision is made to dispose indicators of the wear limit not to be exceeded in the grooves. This wear limit is generally set by national legislatures. The connection between the bottom and the lateral walls of a groove is made precisely at this wear limit.

A plurality of noise reducing devices 5 have been formed in this groove 2, each device 5 being formed, in this first variant of the disclosure, by a first set 50 comprising three flexible blades 501 connected to the bottom of the groove and a second set 51 comprising several flexible blades 511 all connected to one and the same lateral wall 21. All of these flexible blades are made of rubber material of the same kind as the material of which the raised elements of the tread are made.

Each flexible blade 501 secured to the bottom 20 of the groove 2 has a width equal to one third of the width of the groove and has a trapezoidal shape, the outermost edge (that is to say the edge closest to the tread surface 10) being inclined at an angle equal to 20° in the present case. The outermost edges of the three blades 501 are formed so as to be in line with one another in order to form a sort of continuous slope that is able to cooperate with a flexible blade 511 of the second set 51. That point of these blades 501 of the first set 50 that is closest to the tread surface 10 is at a distance H from the bottom equal to 15% of the total depth P of the groove in the present case. These flexible blades 501 connected to the bottom of the groove each have a small thickness which in the present case is equal to 0.4 mm.

Each flexible blade 511 of the second set 51 is secured to the lateral wall 21 and extends over the entire width of the groove. Each flexible blade 511 of the second set comprises an upper edge 512 intended to come into wearing contact with the road during rolling and a lower edge 513 which is intended to cooperate with an upper edge of another blade in order to ensure complementarity and thus to close the cross section of the groove. Apart from the blade closest to the tread surface in the new state, all of the flexible blades of the second set have mutually parallel upper and lower edges that make an average angle A equal to 20° in the present case. This angle A is measured with respect to a direction indicated by an arrow X in FIG. 2, this direction corresponding to a direction both parallel to the tread surface 10 and transverse with respect to the groove 2. The flexible blades 511 of this second set are positioned in a common plane with the blade of the first set in order to ensure that the groove is closed over at least 70% of the cross section of this groove.

Figure 3:
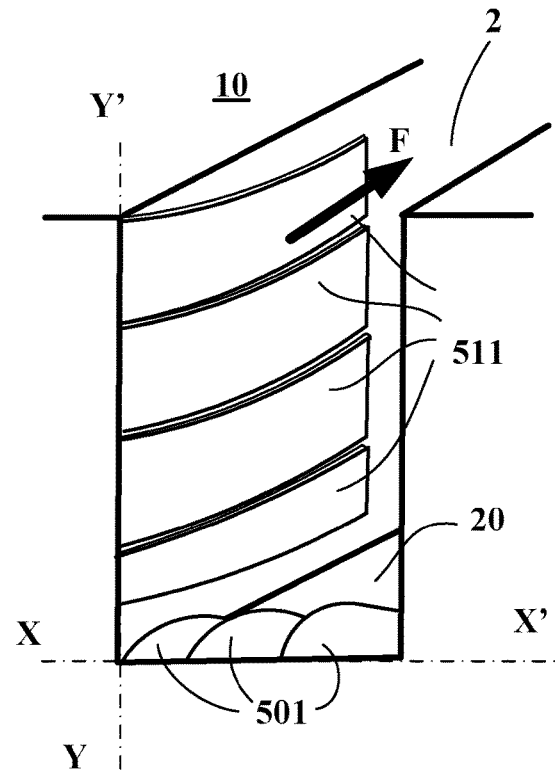
FIG. 3 shows the device from FIG. 2 in an open position under the action of a flow of liquid in the groove.

As can be seen in FIG. 3 which shows the same device 5 subjected to a flow of liquid indicated schematically by an arrow F, each first blade 510 of the first set 50 fixed to the bottom of the groove flexes around an axis XX' parallel to the bottom 20 of the groove while the flexible blades 511 of the second set 51 flex around an axis YY' perpendicular to the axis XX'.

In this variant, the flexible blades of the second set have a thickness equal to 1 mm while the flexible blade fixed to the bottom of the groove has a thickness equal to 0.4 mm. The choice of a smaller thickness for the blades connected to the bottom of the groove is favorable since it makes it possible to reduce the force needed to flex these blades, regardless of the level of wear to the tread, whereas a greater thickness for the blades fixed to the lateral wall is favorable for regular wear to said blades.

By virtue of this structure, it is possible to substantially reduce the demolding forces and thus maintain good quality of closure of the grooves by the device according to the disclosure.

Figure 4:
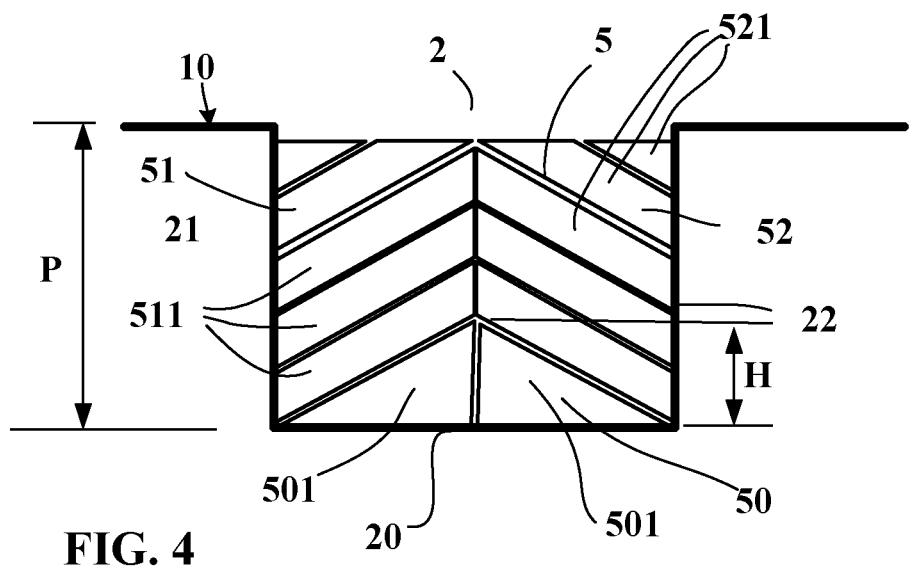
FIG. 4 shows a variant of the disclosure in a position closing a groove.

In a variant shown in FIG. 4, a device according to the disclosure comprises a first set 50 and two second sets 51, 52 of flexible blades.

The first set 50 comprises two flexible blades 501 connected to the bottom 20 of a groove 2, each blade 501 of this first set 50 having the shape of a right-angled triangle. The apex of each triangle furthest from the bottom of the groove is at a distance H from this bottom which is equal to 20% of the depth P of the groove measured in the new state in the present case.

Each lateral wall 21, 22 of the groove 2 is provided with a set of flexible blades 511, 521, respectively—in the present case, five flexible blades having a similar geometry apart from the blades closest to the tread surface 10. All of these blades are formed in the same plane and have complementary geometries so as to close at least 70% of the cross section of the groove in the new state.

All of the blades carried by the lateral walls have lower edges (that is to say ones facing the bottom of the groove) which are planar and rectilinear and inclined at an average angle A equal to 25° in the present case. The blades of each second set cover half the width of the groove.

Figure 5:
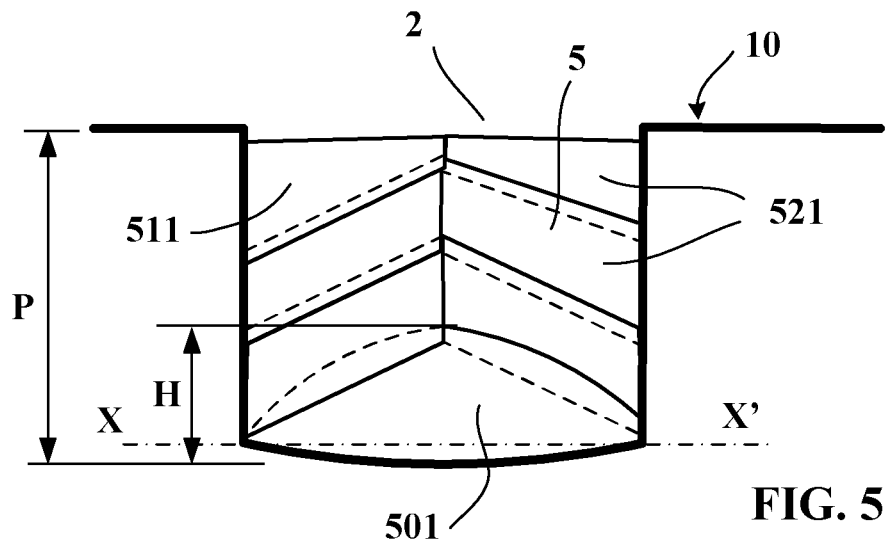
FIG. 5 shows a variant of the disclosure in a position closing a groove.

In another variant, shown in FIG. 5, a device according to the disclosure is fairly similar to the one shown in FIG. 4. Instead of two flexible blades, the first set 50 comprises only a single blade 501 the geometry of which is no longer triangular but circular, the point furthest from the bottom being at a distance H less than 15% of the depth P of the groove in the new state. Moreover, and in order to increase the degree of closure of the cross section of the groove, it is advisable to form each set of blades carried by a lateral wall delimiting the groove such that there is a slight overlap of a blade with its neighbors. An overlap is also formed between the first set and each of the two second sets. These overlaps can be limited to low values, for example 1 mm, given that the space between the flexible blades can be as small as possible while satisfying the manufacturing constraints.

Figure 6:
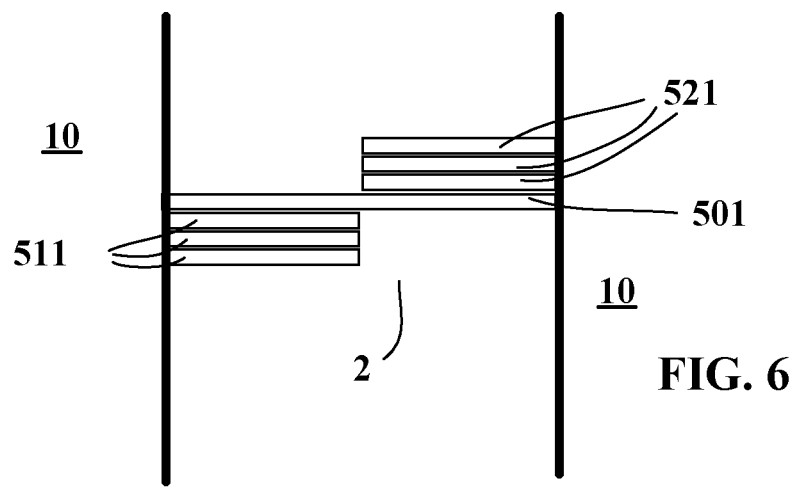
FIG. 6 shows a view of the tread surface of the variant shown in FIG. 5.

FIG. 6 shows a view of the tread surface of the tread shown in FIG. 5. It can be seen that on either side, in the main direction of the groove (that is to say the direction of flow of a liquid inside this groove), of the flexible blade 501 connected to the bottom of the groove are disposed flexible blades 511 and 512 of the second sets 51, 52 respectively.

While the disclosure has been described in general terms and using a number of variants, it should be understood that this disclosure is not limited just to these variants shown and described. Notably, when the lateral walls delimiting a groove make an angle other than 90 degrees with the tread surface in the new state, it is easy for a person skilled in the art to adapt the geometries of each blade to allow the cross section of the groove to be opened when driving over a roadway covered with water. Furthermore, the variants described here can be combined with one another by a person skilled in the art depending on the objective being pursued without departing from the scope of the disclosure as defined by the claims.

The invention claimed is:

1. A tread for a tire, the tread having a tread surface, comprising:
    at least one groove of depth P delimited by two facing lateral walls, the two facing lateral walls being connected together by a bottom;
    at least one groove having a plurality of closing devices for reducing running resonance noise generated by the at least one groove,
    each closing device comprising at least two sets of flexible blades, a first set being connected to a bottom of the groove and able to flex around a first axis, and at least one second set connected to a lateral wall delimiting the groove, the at least one second set able to flex around a second axis, the second axis being different than the first axis,
    wherein each second set connected to a wall includes at least two flexible blades, each flexible blade of this second set extending over at least half the width of the groove;
    each flexible blade of the first set having two lateral faces that obstruct a flow of air in the groove, the two lateral faces of the first set being connected together by edge walls forming a thickness of the blade;
    each flexible blade of the second set having two lateral faces that obstruct the flow of air in the groove, the two lateral faces of the second set being connected together by edge walls forming a thickness of the blade, an upper edge wall able to come into contact with a road during rolling and a lower edge wall facing the bottom of the groove in which the device is disposed, the lower edge wall making a non-zero average angle A with a direction passing through connecting points between the lateral walls and the bottom of the groove, this angle A being such that the lower edge wall tends to diverge from the bottom of the groove when progressing along this lower edge wall from the lateral wall to which it is fixed;
    the flexible blades of the first and second sets have complementary geometries that are suitable for cooperating with one another to close at least 70% of the cross section of the groove; and
    wherein an upper edge wall of each flexible blade of the first set extends parallel with the lower edge walls of the flexible blades of the second set, the upper edge wall of each flexible blade of the first set makes a non-zero average angle with respect to the tread surface.

2. The tread according to claim 1, wherein the average angle A of the lower edge of the flexible blades of each second set is at least equal to 10° and even more preferably at least equal to 20° in order to make demolding easier by reducing forces that act on the blades during demolding the tread from a mold operation.

3. The tread according to claim 1, wherein the flexible blades of the first set and the flexible blades of each second set are disposed to be offset from one another to allow partial overlapping between the lateral faces of said blades.

4. The tread according to claim 1, wherein the maximum height H of each flexible blade of the first set fixed to the bottom of the groove is at most equal to 80% of the depth P of the groove.

5. The tread according to claim 1, wherein the thickness of each flexible blade carried by the groove bottom is less than the thickness of each flexible blade carried by a lateral wall of the groove.

6. The tread according to claim 5, wherein the thickness of each flexible blade fixed to the bottom of the groove is at most equal to 0.4 mm and even more preferably at most equal to 0.3 mm.

7. The tread according to claim 6, wherein the noise reducing device formed in a groove comprises a first set of flexible blades of triangular geometry.

8. The tread according to claim 1, wherein the device closes the cross section of the groove over at least 90% of the cross section of said groove in a new state of the tread.

* * * * *